United States Patent
Kokichi

(10) Patent No.: US 9,513,455 B2
(45) Date of Patent: Dec. 6, 2016

(54) LENS DRIVING DEVICE

(71) Applicant: Jiangxi Leiyuan Permanent Magnetic Materials Co., Ltd., Ganzhou, Jiangxi Province (CN)

(72) Inventor: Terajima Kokichi, Tokyo (JP)

(73) Assignee: Jiangxi Leiyuan Permanent Magnetic Materials Co., Ltd., Ganzhou (CN)

(*) Notice: Subject to any disclaimer, the term of this patent is extended or adjusted under 35 U.S.C. 154(b) by 155 days.

(21) Appl. No.: 14/153,349

(22) Filed: Jan. 13, 2014

(65) Prior Publication Data

US 2015/0103422 A1    Apr. 16, 2015

(30) Foreign Application Priority Data

Oct. 10, 2013 (JP) .................................. 2013-213052

(51) Int. Cl.
  *G02B 7/02* (2006.01)
  *G02B 7/04* (2006.01)

(52) U.S. Cl.
  CPC .................. *G02B 7/023* (2013.01); *G02B 7/04* (2013.01)

(58) Field of Classification Search
  CPC ............... G02B 7/04; G02B 7/09; G02B 7/10; G02B 7/02; G02B 7/023
  USPC ........................................ 359/824; 310/12.01
  See application file for complete search history.

(56) References Cited

U.S. PATENT DOCUMENTS 7,285,879 B2 * 10/2007 Osaka ..................... G02B 7/08
                                                                  359/824

* cited by examiner

*Primary Examiner* — Zachary Wilkes
(74) *Attorney, Agent, or Firm* — Rankin, Hill & Clark LLP

(57) ABSTRACT

A lens driving device and the lens holder cannot tilt when the lens holder moves up due to the coil energized. The inside holding portion (14a) of the front spring member (14A) is connected to the surface of the +Z side of the front connection portion (13b) of the lens holder (13), the inside holding portion (14a) of the rear spring member (14B) is connected to the surface of the +Z side of the rear connection portion (13c), the outside diameter of which is larger than the outside diameter of the front connection portion (13b), the outside holding portion (14b) is connected with the base (12) in the manner of shifting the inside holding portion (14a) towards the −Z side, so as to apply the pressure of the −Z-axis direction to the lens holder (13).

1 Claim, 7 Drawing Sheets

(a)

(b)

(c)

(d)

LENS DRIVING DEVICE

TECHNICAL FIELD

The present invention relates to a lens driving device suspended and supported by a spring member, particularly to a lens driving device which drives a lens holder holding a lens to move in the optical axis direction by means of an electromagnetic drive element.

BACKGROUND

FIG. 5 is an exploded perspective view showing a conventional lens driving device 20 using an electromagnetic drive element.

The lens driving device 20 includes: a lens holder 23 for holding a lens (not shown); a coil 26; a permanent magnet 25; a magnet yoke 21; a base 22; and a spring member 24 being composed of a front spring member 24A and a rear spring member 24B. In this Figure, the photographed object side is set as the positive direction of the Z axis (+Z side, +Z-axis direction or the +Z), the axes that are orthogonal to each other and orthogonal to Z-axis are respectively used as the X axis and Y axis.

A lens is mounted to the lens holder 23 in such way that the optical axis thereof is in the Z-axis direction.

The lens holder 23 includes a cylindrical portion 23a, a front connection portion 23b and a rear connection portion 23c, wherein the cylindrical portion 23a has the shape of a cylinder and orientates the center axis 23A in the Z-axis direction, the front connection portion 23b with annular groove(s) is located on the +Z side of the cylindrical portion 23a, the rear connection portion 23c with annular groove(s) is arranged on the −Z side of the cylindrical portion 23a, a lens (not shown) is held inside the cylindrical portion 23a by the lens holder 23 in such way that the optical axis thereof coincides with the center axis 23A.

The coil 26 winds annularly around the central axis 23A of the lens holder 23, and is attached to the cylindrical portion 23a of the lens holder 23.

The magnet yoke 21 is made of a soft magnetic material, and has a cross section of substantially L-shape. The magnet yoke 21 is composed of a side wall portion 21a and a top surface portion 21b, wherein the side wall portion 21a of a rectangular frame shape extends in the X-axis direction and the Y-axis direction, and the top surface portion 21b of a substantially rectangular plate shape is connected with the +Z side of the side wall portion 21a, and the top surface portion 21b has a circular opening portion 21k open along the Z-axis direction in the central portion thereof. A plurality of (e.g. four) rectangular shaped permanent magnets 25 are mounted in the inner side of the side wall portion 21a of the magnet yoke 21. Permanent magnets 25 are disposed opposite to each other in the X-axis direction and the Y-axis direction respectively about the coil 26, and they are spaced a distance with the side surface formed by the winding of the coil 26.

The base member 22 of a substantially rectangular plate shape has a circular opening portion 22k in the center portion, wherein the board surface thereof faces the Z-axis direction. A restriction portion 22a is formed on the outer portion of the opening portion 22k in X-axis direction and Y-axis direction, it abuts against the rear end portion 23d of the lens holder 23, and restricts the lens holder 23 in the rearmost position of the Z-axis direction. Furthermore, a connection surface 22b is formed on the outside of the restriction portion 22a in the X-axis direction and Y-axis direction, and protrudes in the +Z direction relative to the restriction portion 22a, and connects with the outside holding portion 24b of a rear spring member 24B. Edge portion 22c is arranged on the outermost periphery of the connection surface 22b, and protrudes towards the +Z side relative to the connection surface 22b, and restricts the outside holding portion 24b in a mounting position in the X-axis direction and the Y-axis direction, further, and the rear end portion in the Z-axis direction of the side wall portion 21a is connected to the surface of the +Z side of the edge portion 22c. The spring member 24 is a leaf spring of substantially rectangular shape, which is composed of a front spring member 24A and a rear spring member 24B. The front spring member 24A includes an inside holding portion 24a1, an outside holding portion 24b1 and a plurality of arm portions 24c1, wherein the inside holding portion 24a1 has a circle annular shape, the outside holding portion 24b1 has a rectangular shape, the plurality of arm portions 24c1 are arranged between the inside holding portion 24a1 and the outside holding portion 24b1, and each arm portion 24c1 winds and extends circumferentially and radially, and makes the inside holding portion 24a1 and the outside holding portion 24b1 connected to each other, and each holding portion 24b1 has a curve shape.

The rear spring member 24B is composed of two dividing spring members 241 and 242, and the rear spring member 24B has an inside holding portion 24a2 consisting of one +X side arc-shaped part and another −X side arc-shaped part, and the rear spring member 24B has an outside holding portion 24b2 consisting of one +X side U-shaped part and another −X side of U-shaped part. Each of the dividing spring member 241, 242 includes a plurality of arm portions 24c2, wherein the plurality of arm portions 24c2 each winds and extends circumferentially and radially, which makes the inside holding portion 24a2 and the outside holding portion 24b2 connect with each other, and each has a curve shape. The rear spring member 24B makes one terminal end 261 of the coil 26 connect with the dividing spring members 241 by using solder or the like, and makes the other terminal end 262 of the coil 26 connect with the dividing spring member 242, so as to form the power supply path.

The inside holding portion 24a1 of the front spring member 24A is connected and fixed on the surface of the +Z side of the front connection portion 23b arranged on the lens holder 23, the outside holding portion 24b1 of the front spring member 24A is connected and fixed on the +Z side of the top surface portion 21B of the magnet yoke 21. The inside holding portion 24a2 of the rear spring member 24B is connected and fixed with the surface of the +Z side of the rear connection portion 23c arranged on the lens holder 23, the outside holding portion 24b2 is located in the inner periphery side of the edge portion 22c of the base 22 so as to adjust the position, and is connected and fixed on the surface of the +Z side of the connection surface 22b.

The spring member 24 is composed of the front spring member 24A and the rear spring member 24B and each has a flat shape extending in the X-axis direction and the Y-axis in a natural state (i.e. the state where the load is not applied) before assembling. However, as shown in FIG. 6 (a)~FIG. 6(d), when the spring member 24 is assembled with the all kinds of parts, the outside holding portion 24b1, 24b2 relative to the inside holding portion 24a1, 24a2 distorts (offsets) in the −Z direction, thus, the assembling is finished in the state of flexure of the arm portion 24c1, 24c2, and in the state of applying preload in −Z axis direction to the lens holder 23.

Thus, when the coil 26 is not in the energized state, the prepressure in the −Z direction is applied to the lens holder 23 suspended and supported by the spring member 24 mounted on the side of the base 22 due to the restoring force of the arm portion 24c1, 24c2, and the rear end portion 23d of the lens holder 23 abuts against the restriction portion 22a of the base 22.

Furthermore, when the coil 26 is in the energized state, and the Lorentz force in the +Z direction applied onto the coil 26 excesses the prepressure in the −Z direction, the rear end portion 23d of the lens holder 23 departs from the restriction portion 22a of the base 22, the lens holder 23 moves in the +Z direction to a position wherein the restoring force of the arm portion 24c1, 24c2 is balanced.

Patent Document 1: Japan Patent Publication No. 2007-316395

FIG. 6(a)–FIG. 6(d) are schematic views showing the assembling process of the lens driving device 20.

Referring to FIG. 6 (a), the restriction pin J2a of the spring member mounting jig J2 is inserted into the inner peripheral side of the cylindrical portion 23a of the lens holder 23 with the coil 26 from the +Z side, and the restriction pin J2a is fixed and positioned in such way that the central axis line 23A of the lens holder 23 is aligned with the center of the spring member mounting jig J2. Thereafter, a rear spring member 24B is disposed at the −Z side of the lens holder 23, so that a pressing pressure is applied to the inside holding portion 24a2 in +Z direction from the −Z side, and the rear spring member 24B is connected to the −Z side of the rear connection portion 23c and fixed thereon by adhesive. Then, the terminal ends 261 and 262 of the coil are connected to the spring member 241,242 by soldering or the like.

Subsequently, as shown in FIG. 6 (b), the spring member mounting jig J2 is removed from the cylindrical portion 23a of the lens holder 23, the restriction pin J3a of the base mounting jig J3 is inserted into the inner periphery side of the cylindrical portion 23a of the lens holder 23 from the −Z side. The base 22 is preinstalled in the concave portion J3b of the base mounting jig J3. Center of the base 22 in the X-axis direction and the Y-axis direction is determined due to the restriction of the inner wall surface J3c of the concave portion J3b.

The rear end portion 23d of the lens holder 23 with the restriction pin J3a of the base mounting jig J3 inserted thereinto abuts against the surface of the +Z side of the restriction portion 22a of the base 22, the lens holder 23 is positioned and holds the lens (not shown) in such way that the center of the base portion 23a of the lens holder 23 is centrally aligned with the restriction pin J3a of the base mounting jig J3. Thereafter, the outside holding portion 24b2 of the rear spring member 24B relative to the inside holding portion 24a2 distorts in the −Z axis so as to restrict the position in the X-axis direction and the Y-axis direction using the edge portion 22c of the base 22, then apply a pressing force in the −Z direction onto the outside holding portion 24b2, at the same time the connection surface 22b of the base 22 is connected and fixed by an adhesive.

Subsequently, as shown in FIG. 6 (c), a magnet yoke 21 installed with a permanent magnet 25 is covered on the base 22 from the +Z side, and the rear end portion in the Z axis direction of the side wall portion 21a is connected and fixed on the surface of the +Z side of the edge portion 22c. The inside holding portion 24a1 of the front spring member 24A is mounted to the surface of the +Z side of the front side connection portion 23b of the lens holder 23 from +Z side, then apply a pressing force of the −Z direction onto the inside holding portion 24a1 from +Z side, at the same time the surface of the +Z side of the front connection portion 23b is connected and fixed by an adhesive.

And then, as shown in 6 (d), apply a pressing force in the −Z axis direction onto the outside holding portion 24b1 so as to make the outside holding portion 24b1 of the front spring member 24A relative to the inside holding portion 24a1 offset in the −Z axis, at the same time the outside holding portion 24b1 is connected and fixed to the surface of the +Z side of the top portion 21B of the magnet yoke 21 by an adhesive or the like.

As shown in FIG. 7, the lens driving device 20 assembled by the above assembly process, when the coil 26 is energized, and the rear end portion 23d of the lens holder 23 departs from the restriction portion 22a of the base 22 and shifts in the +Z axis, an inclination phenomenon often occurs due to the tilt of the lens holder 23.

One reason for generating this phenomenon is that the unwanted residual stress in the direction (X axis direction, Y axis direction) perpendicular to the Z-axis direction is generated on the arm portion 24c2 of the rear spring member 24B. That is to say, the base 22 use the inner wall surface J3c of the concave portion J3b of the base mounting jig J3 as a reference for positioning, and the lens holder 23 uses the restriction pin J3a of the base mounting jig J3 as a reference for positioning. So the center of the lens holder 23 mounted on the base mounting jig J3 and the center of the base 22 are often in the misaligned state. Thus, the outside holding portion 24b2 of the rear spring member 24B is located in the inner side of the edge portion 22c of the base 22, wherein the center of which is in a deviate state.

However, the inside holding portion 24a2 of the rear spring member 24B is fixed on the rear connection portion 23c of the lens holder 23, accordingly, even if the displacement of the outside holding portion 24b occurs, the inside holding portion 24a2 cannot move from the connected rear connection portion 23c. Thus, in order to make the outside holding portion 24b2 of the rear spring member 24B locate in the inner side of the edge portion 22c of the base 22, the outside holding portion 24b2 moves in the X-axis direction and the Y-axis direction for alignment, the outside holding portion 24b2 is eccentric with respect to the fixed inside holding portion 24a2.

As a result, the inside holding portion 24a2 and arm portion 24c2 connected with the outside holding portion 24b2 generate strain in a direction perpendicular to the Z axis, the rear spring member 24B is fixed in a state that the stress towards the direction perpendicular to the Z axis is remained. Further, the lens driving device 20 is assembled in a state that the strain is generated in a direction perpendicular to the Z-axis.

Thus, when the coil 26 is not energized, and stress towards the direction perpendicular to the Z axis is remained on the arm portion 24c2 of the rear spring member 24B, the lens holder 23 under the action of prepressure in the −Z direction of the rear end portion 23d of the lens holder 23 abuts against the restriction portion 22a of the base 22 so as to facing the Z-axis, thus, therefore, the optical axis of the lens (not shown) faces the direction of the photographic direction. However, when the coil 26 is energized, and the lens holder 23 moves up, the stress remained on the arm portion 24c2 of the rear spring member 24B is released, the center of the inside holding portion 24a2 moves towards the center of the outside holding portion 24b2, thereby the lens holder 23 rotates about the axis perpendicular to the Z axis which results in the inclined phenomenon.

When such a tilt of the lens holder 23 occurs, the lens held by the lens holder 23 is also tilt. Therefore, the image of the image sensor (not shown) formed by the tilt lens becomes distorted, the problems, for example, bleeding, blur, image distortion, image quality deteriorated, occurs.

Further, due to during the step of assembling of the rear spring member 24B, the assembling jig is changed from the spring member mounting jig J2 to base mounting member jig J3, so the step becomes complicated, the rear spring member 24B deforms during the jig change, assembly operation time becomes longer, the type of assembling jigs increased, manufacturing costs risen and there are other shortcomings.

SUMMARY

Accordingly, the present invention is accomplished in view of the conventional problems, and its object is to provide a lens driving device, wherein the cost thereof cannot be increased, and the lens holder cannot tilt when the lens holder moves upward due to the coil energized.

In the lens driving device of the present invention, the photographed object side is set as the front direction of the Z axis, and the lens driving device includes a lens holder, a spring member, a coil, a permanent magnet, and a base, wherein the lens holder has a cylindrical portion whose center axis is orientated in the Z axis direction, the cylindrical portion holds a lens on the inner periphery side, the spring member is fixed on the cylindrical portion, and the lens holder is supported to move in the Z-axis direction, the coil is located on the outer periphery side of the cylindrical portion and winds around the central axis of the cylindrical portion, the permanent magnet is arranged on the outer periphery side of the coil and spaced from the coil, and the base supports the permanent magnet, the lens driving device of the present invention is characterized in that, the spring member comprises a front spring member and a rear spring member located backwards relative to the front spring member in the Z-axis, the front spring member and the rear spring member each includes an arm portion extending orthogonal to the Z-axis direction, an inside holding portion arranged inside the arm portion and connected with one end of the arm portion, an outside holding portion arranged outside the arm portion and connected with the other end of the arm portion, a front connection portion and a rear connection portion of flange shape are formed on the lens holder, wherein, the front connection portion has a groove in front of the cylindrical portion in the Z axis direction, and the rear connection portion has an outer diameter larger than that of the front connection portion along the rear direction of the Z axis direction of the cylindrical portion, the inside holding portion of the rear spring member is fixed on the front surface of the rear connection portion in the Z-axis direction, the inside holding portion of the front spring member is fixed on the front surface of the front connection portion in the Z-axis direction, the outer side holding portion (s) of one or both of the front spring member and the rear spring member is/are pressed backwards relative to the inside holding portion in the Z-axis direction, so as to apply pressure backwards to the lens holder in the Z-axis direction.

Thus, the inside holding portions of the front spring member and the rear spring member are fixed on the lens holder from the fore direction of the Z-axis direction, the outside holding portion of one or both of the front spring member and the rear spring member distorts backwards relative to the inside holding portion in the Z-axis direction, and apply pressure to the lens holder backwards in the Z-axis direction, and when the outside holding portion of the rear spring member is fixed on the base, it will not be eccentric with respect to the front holding portion, thus, there is no stress in the direction perpendicular to the Z-axis direction remain on the arm portion. Accordingly the tilt of the lens holder may be prevented when the coil is energized to move the lens holder up.

Furthermore, the lens driving device of the present invention is characterized in that, the inside holding portion of the rear spring member has a larger inner diameter than the outer diameter of the front connection portion of the lens holder, and the inside holding portion of the front spring member has a smaller inner diameter than the outer diameter of the front connection portion of the lens holder.

So, as the inside holding portion of the rear spring member has a larger inner diameter than the outer diameter of the front connection portion of the lens holder, and the inside holding portion of the front spring member has a smaller inner diameter than the outer diameter of the front connection portion of the lens holder, the inside holding portion of the rear spring member can be connected and fixed on the rear connection portion of the lens holder from the front in the Z-axis direction, and the inside holding portion of the front spring member may be connected and fixed on the rear connection portion of the lens holder from the front in the Z-axis direction.

Summary of the invention described above does not illustrate all the necessary features of the present invention, the sub-combination of the features can also constitute a technical solution of the present invention.

SYMBOLIC DESCRIPTION

10 Lens driving device
11 Magnet yoke
12 Base
13 Lens holder
14A Front spring member
14B Rear spring member
15 Permanent magnet
16 Coil
17 Magnet holder

DETAILED DESCRIPTION OF THE PREFERRED EMBODIMENTS

Hereinafter, the embodiments of the present invention will be described in detail, but the embodiments are not limited to the claimed invention in the claims, in addition, the combination of the features described in the embodiment are not all necessary for the purpose of solving means.

Figure 1:
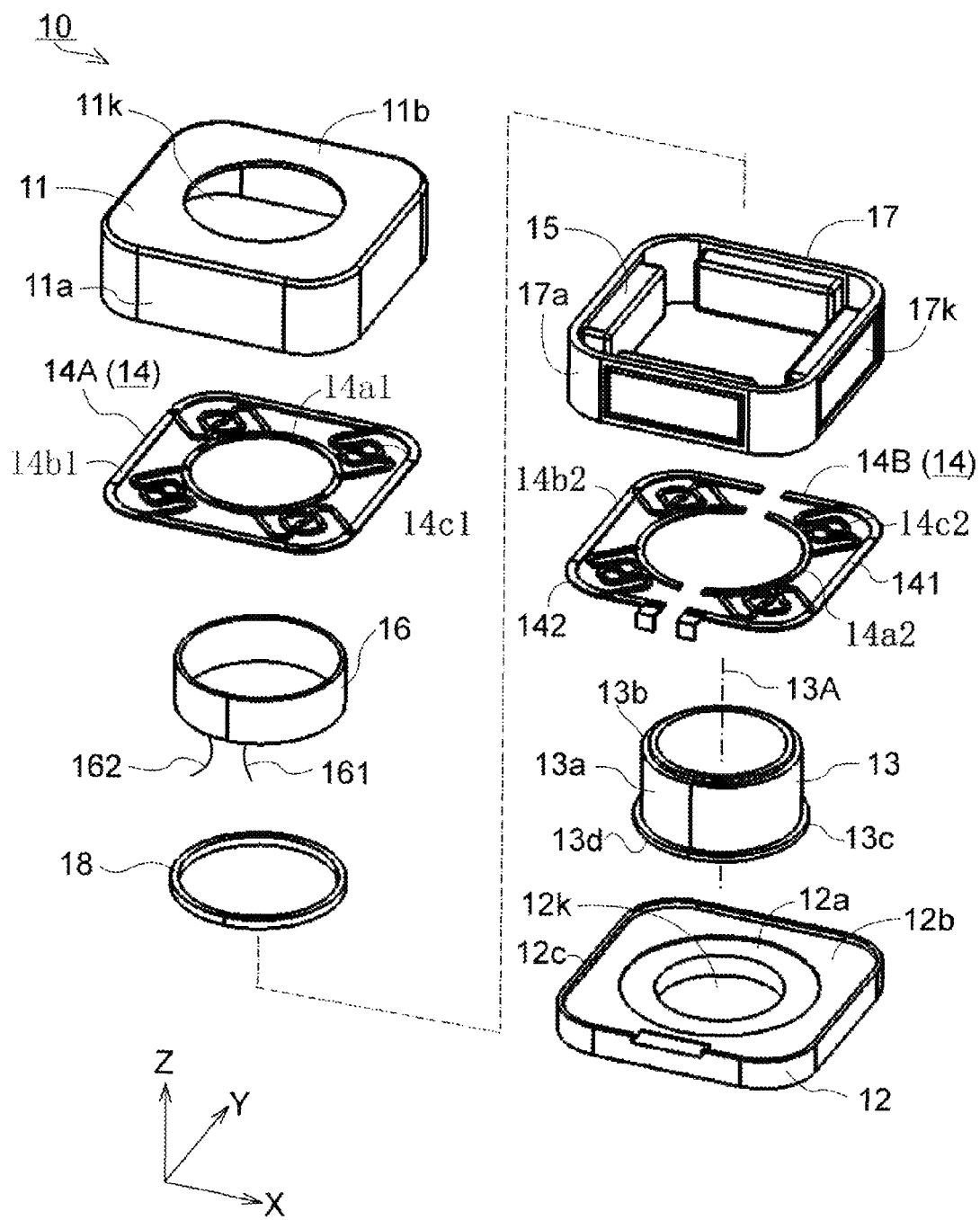
FIG. 1 shows an exploded perspective view of the lens driving device in accordance with the embodiment one of the present invention.
Figure 2:
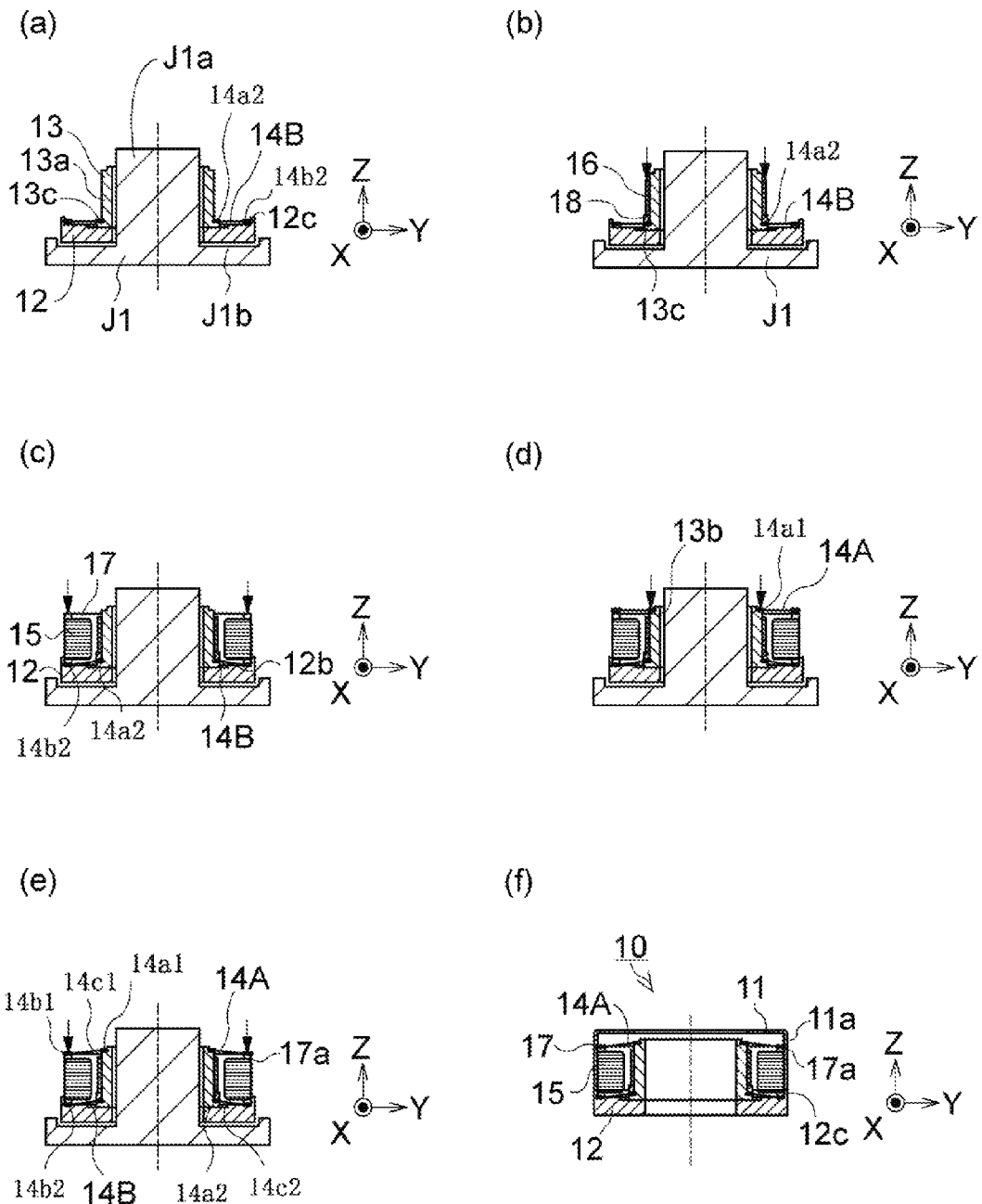
FIG. 2 is a schematic sectional view of assembling process of the lens driving device in accordance with embodiment one of the present invention.

FIG. 1 shows an exploded perspective view of the structure of the lens driving device 10 in accordance with the embodiment one of the present invention, and FIG. 2 is a schematic sectional view of assembling process of the lens driving device 10 in accordance with embodiment one of the present invention. In the present specification, the photographed object side is set as the front direction of the Z axis (sometimes referred to +Z side, +Z-axis direction or the +Z), the axes that are orthogonal to each other and orthogonal to Z-axis are respectively used as the X axis and Y axis.

The lens driving device 10 includes: a lens holder 13 for holding a lens (not shown); a coil 16; a permanent magnet 15; magnet holder 17 for holding the permanent magnet 15; magnet yoke 11; base 12 for supporting the permanent magnet 15; a spring member 14 consisting of a front spring member 14A and a rear spring member 14B and capable of supporting the lens holder 13 to move along the Z-axis direction; and a washer 18.

A lens (not shown) is mounted to the lens holder 13 in such way that the optical axis thereof is orientated along the Z direction. The lens is held in the inner side of the cylindrical portion 13a of the lens holder 13 in such way that the optical axis thereof coincides with the center axis 13A of the lens holder 13.

The lens holder 13 includes a cylindrical portion 13a, a front connection portion 13b and a rear connection portion 13c, wherein, the cylindrical portion 13a has a cylindrical shape and orientates the center axis 23A in the Z-axis direction, the front connection portion 13b having an annular groove is located on the +Z side of the cylindrical portion 13a, the rear connection portion 13c is flange shaped at the −Z side of the cylindrical portion 13a, and the outer diameter of the rear connection portion 13c is larger than that of the front connection portion 13b.

The coil 16 winds around the central axis 13A of the lens holder 13 into a circular ring shape, and is mounted to the outer peripheral side of the cylindrical portion 13a of the lens holder 13.

The magnet holder 17 is made of non-magnetic material. The magnet holder 17 is composed of a side wall portion 17a and a magnet mounting hole 17k, wherein the side wall portion 17a forms an open hole of substantially rectangle shape along the positive Z axis direction, the magnet mounting hole 17k is arranged in the inner periphery side of the side wall portion 17a and holds the permanent magnet 15.

The magnet yoke 11 is a box member of substantially L-shaped cross section made of soft magnetic material. The magnet yoke 11 is composed of a side wall portion 11a and top surface portion 11b, wherein the side wall portion 11a has a rectangle shape extending both in the X-axis direction and the Y-axis direction, and the top surface portion 11b extends both along the X-axis direction and the Y-axis direction starting from the +Z side of the side wall portion 11a, and the top surface portion 11b has a circular opening portion 11k of substantially rectangle plate shape in the central portion open along the Z-axis direction. Four permanent magnets 15 held by the magnet holder 17 are arranged at the inner side of the side wall portion 11a of the magnet yoke 11. The permanent magnets 15 are located around the coil 16 (outer peripheral side of the coil 16) and spaced a distance with the side surface of the wound coil 16, and permanent magnets 15 are disposed opposite to each other in the X-axis direction and the Y-axis direction respectively. The magnetic poles of each permanent magnet 15 are formed at the side surface opposite to the coil 16.

The base member 12 is a substantially rectangle plate shaped member having an opening 12k of circular shape formed in the center portion. A restriction portion 12a is formed on the base 12, and the restriction portion 12a forms outside the opening 12k in the X-axis direction and Y-axis direction, abutting against the rear end portion 13d of the lens holder 13 to restrict the lens holder 13 at the rearmost position of the Z-axis direction. Furthermore, a connection surface 12b is formed outside the restriction portion 12a, protruding relative to the restriction portion 12a in the +Z axis, and the connection surface 12b is connected to an outside holding portion 14b of a rear spring member 14B. An edge portion 12c is formed on the outermost periphery of the connection surface 12b, and edge portion 12c protrudes relative to the connection surface 12b along the +Z side so as to restrict the outside holding portion 24b at a mounting position in the X-axis direction and the Y-axis direction. The rear end portion in the Z-axis direction of the side wall portion 11a of the magnet yoke 11 is connected onto the surface of the +Z side of the edge portion 12c.

The washer 18 is an annular member, and is mounted on the +Z side of the inside holding portion 14a2 of the rear spring member 14B. The washer 18 holds and fixes the inside holding portion 14a2 of the rear spring member 14B by means of the washer 18 and the rear connection portion 13c of the lens holder 13.

The spring member 14 is a ring-shaped leaf spring in the state of assembling of the lens driving device 10, and the spring member 14 is composed of a front spring member 14A and a rear spring member 14B arranged at the rear position relative to the front spring member 14A in the Z-axis.

The front spring member 14A includes an inside holding portion 14a1 of circle annular shape, an outside holding portion 14b1 of substantially rectangular shape and a plurality of arm portions 141 with curve shape and extending along the direction orthogonal to the Z-axis direction. Each arm portion 14c1 is arranged between the inside holding portion 14a1 and the outside holding portion 14b1, winding and extending circumferentially and radially, connecting the inside holding portion 14a1 with the outside holding portion 14b1.

The rear spring member 14B is formed by two split spring members 141 and 142, the split spring members 141 and 142 as a whole part has an inside holding portion 14a2 consisting of one +X side arc-shaped part and another −X side arc-shaped part, and an outside holding portion 14b2 consisting of one +X side U-shaped part and another −X side of U-shaped part. Each of the split spring member 141, 142 includes a plurality of arm portions 14c2, the plurality of arm portions 14c2 wind and extend circumferentially and radially, connecting the inside holding portion 14a2 with the outside holding portion 14b2 in a curve shape.

The inside holding portion 14a2 of the rear spring member 14B has an inner diameter larger than the outer diameter of the front connection portion 13b of the lens holder 13. Furthermore, the inside holding portion 14a1 of the front spring member 14A has an inner diameter smaller than the outer diameter of the front connection portion 13b of the lens holder 13. one end 161 of the coil 16 is connected with the split spring members 141 by using e.g. a solder and the like, while the other end 162 of the coil 16 is connected with the split spring members 141 by using e.g. a solder and the like, accordingly, the rear spring member 14B may play a role as a power supply route.

The inside holding portion 14a1 of the front spring member 14A is connected with and fixed on the surface of the +Z side of the front connection portion 13b arranged on the lens holder 13, the outside holding portion 14b1 is connected with the end surface of the +Z side of side wall portion 17a of the magnet holder 17 and fixed thereon. Furthermore, the inside holding portion 14a2 of the rear spring member 14B is connected with and fixed on the surface of the +Z side of the rear connection portion 13c arranged on the lens holder 13, wherein the outside holding portion 14b2 is located in the inner periphery side of the edge portion 12c of the base 12 so as to adjust the position, and is connected and fixed on the surface of the +Z side of the connection surface 12b.

The front spring member 14A and the rear spring member 14B for forming the spring member 14 each has a flat shape extending along the X-axis direction and the Y-axis in a natural state (i.e. the state without load) before assembling. On the other hand, as shown in FIG. 2 (a)~FIG. 2(f), after the assembling, each outside holding portion 14b1, 14b2 distorts relative to the inside holding portion 14a1, 14a2 in the −Z side with the arm portion 14c1, 14c2 in a state of flexure, thus, in a state of the applying prepressure (pressurized) in −Z axis direction to the lens holder 13.

Thus, when the coil 16 is not energized, the prepressure in the −Z direction is applied to the lens holder 13 due to the restoring force of the arm portion 14c1, 14c2. In such state, the rear end portion 13d of the lens holder 13 abuts against the restriction portion 12a of the base 12, the center axis 13A of the lens holder 13 is orientated along the Z direction, and the optical axis of Lens mounted onto the lens holder 13 is also orientated along the Z direction.

Further, when the coil 16 is in the energized state, and the Lorentz force in the +Z direction applied on the coil 16 excesses the prepressure in the −Z direction, the rear end portion 13d of the lens holder 13 departs from the restriction portion 12a of the base 12, the lens holder 13 moves along the +Z direction to a position wherein the restoring force of the arm portion 14c1, 14c2 is balanced.

FIG. 2(a)~FIG. 2(d) are schematic views showing the assembling process of the lens driving device 10. Hereinafter, the assembling process of the lens driving device 10 will be described.

As shown in FIG. 2(a), the base 12 is inserted into the concave portion J1b of the mounting jig J1 from the +Z side, and the restriction pin J1a of the mounting jig J1 is inserted into the inner diameter portion of the cylindrical portion 13a of the lens holder 13 from the −Z side.

The inside holding portion 14a2 of the rear spring member 14B is then rested on the surface of +Z side of the rear connection portion 13c of the lens holder 13 so as to move along the X-axis and Y-axis direction, and the outside holding portion 14b2 is aligned so as to connect with the connection portion 12b of the inner peripheral side of the edge portion 12c of the base 12. At this time, the inside holding portion 14a2 of the rear spring member 14B is fixed onto the rear connection portion 13c, thus, even if the rear spring member 14B moves along the X-axis and Y-axis direction on the rear connection portion 13c, the inside holding portion 14a2 can maintain concentric with the rear connecting portion 13c. That is, the arm portion 14c2 can move together with the rear connection portion 13c in a direction perpendicular to the Z-axis (X-axis direction, Y-axis direction) without a strain.

Subsequently, as shown in FIG. 2 (b), the washer 18 and the coil 16 is stacked on the surface of the +Z side of the inside holding portion 14a2 of the rear spring member 14B in accordance with the sequence order of the washer 18 and the coil 16. A pressing force is applied to the coil 16 from the +Z side towards the −Z axis direction, meanwhile the inside holding portion 14a2 of the rear spring member 14B, the washer 18 and the coil 16 are connected and fixed to the cylindrical portion 13a and the rear connecting portion 13c by an adhesive. Then, the ends 161, and 162 of the coil 16 are connected to the split spring members 141 and 142 respectively by solder.

Subsequently, as shown in FIG. 2 (c), the magnet holder 17 bearing the permanent magnet 15 is mounted on the surface of the +Z side of the outside holding portion 14b2 of the rear spring member 14B, and a pressing force is applied on the magnet holder 17 from the +Z side of towards the −Z axis direction. As the pressing force is applied, the outside holding portion 14b2 of the rear spring member 14B becomes shift towards the −Z side relative to the inside holding portion 14a, the outside holding portion 14b2 of the rear spring member 14B and the lower end portion of the side wall portion 17a of the magnet holder 17 are connected and fixed to the connection surface 12b of the base 12 by adhesive and the like.

Subsequently, as shown in FIG. 2 (d), the inside holding portion 14a1 of the front spring member 14A is mounted on the surface of the +Z side of the front connection portion 13b of the lens holder 13, then a pressing force is applied from the +Z side towards the −Z axis direction, meanwhile then are connected and fixed by an adhesive and the like.

Subsequently, as shown in FIG. 2 (e), a pressing force is applied on the outside holding portion 14b1 of the front spring member 14A in −Z axis direction, so that the outside holding portion 14b1 shifts towards the −Z side relative to the inside holding portion 14a1. The outside holding portion 14b1 of the front spring member 14A is connected and fixed to the upper end of the side wall portion 17a of the magnet holder 17 by adhesive.

Thus, the respective outside holding portion 14b1 of the front spring member 14A and the rear spring member 14B can shift towards the −Z side relative to the inside holding portion 14a1 without eccentric positioning, and the assembling is completed in the state of flexure of the arm portion 14c1, as a result, a prepressure is loaded on the lens holder 23 in −Z axis direction.

And then, as shown in FIG. 2 (f), the magnet yoke 11 is mounted on the outer periphery side of the side wall portion 17a of the magnet holder 17 in such way that the front spring member 14A and the magnet holder 17 are covered from the +Z side. Then the magnet holder 17 bearing the permanent magnet 15, the edge portion 12c of the base 12 and the side wall portion 11a of the magnet yoke 11 are connected and fixed by adhesive.

In the present embodiment, both the outside holding portions 14b1 of the front spring member 14A and the rear spring member 14B are pressed and fixed backwards in the Z-axis direction, or else the outside holding portion 14b1, 14b2 of any one of the front spring member 14A and the rear spring member 14B is pressed and fixed backwards in Z-axis direction.

In such assembled lens driving device 10, the inside holding portion 14a1 and the outside holding portion 14b1 of the front spring member 14A, the inside holding portion 14a2 and the outside holding portion 14b2 of the rear spring member 14B are all concentrically aligned without eccentric. Because there is no strain on the arm portion 14c2 in a direction perpendicular to the Z axis, the undesired stress will not remain in the direction perpendicular to the Z-axis direction, and only the stress remains in the Z-axis direction that generated due to the outside holding portion 14b2 shift towards the −Z side.

Therefore, when the coil 16 is energized, and the rear end portion 13d of the lens holder 13 departs from the restriction portion 12a of the base 12 and moves along the +Z direction, the tilt will not occur when the lens holder 13 rotates about the axis perpendicular to the Z axis. The optical axis of lens held by the lens holder 13 can be maintained in the Z-axis direction, therefore the formed image of the image sensor (not shown) cannot distort, and the quality of the image cannot deteriorate.

Furthermore, the lens driving device 10 can be assembled by sequentially stacking all the members on the mounting jig J1, which can reduce the types of the mounting jig to be used, simplify the process, shorten the time required for the assembling, and reduce manufacturing costs.

Figure 3:
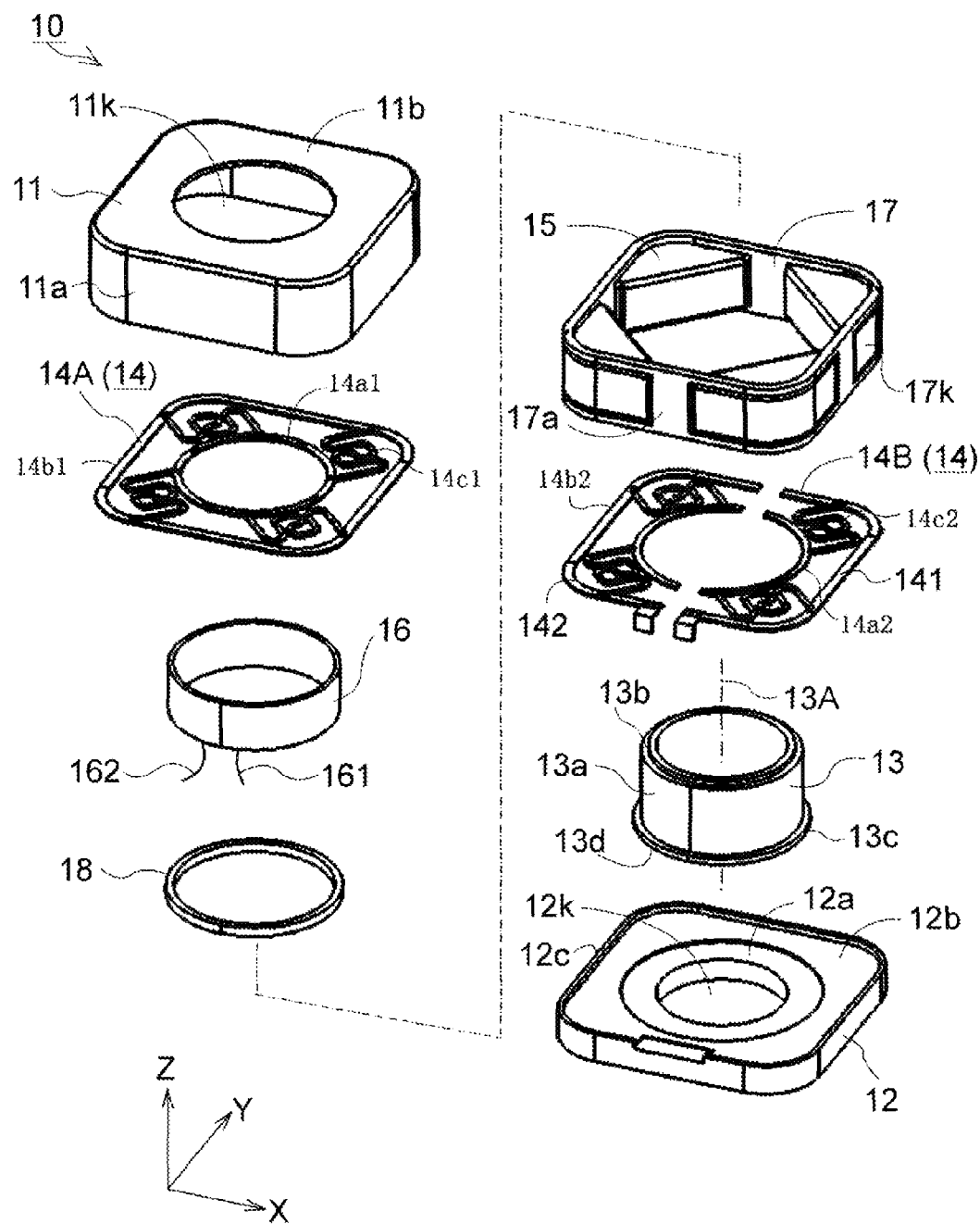
FIG. 3 shows an exploded perspective view of the lens driving device in accordance with the embodiment two of the present invention.

FIG. 3 shows an exploded perspective view of the lens driving device 10 in accordance with the embodiment two of the present invention. In the embodiment two of the present invention, the shape of the permanent magnets 15, the shape of the magnet holder 17 for holding the permanent magnets 15 are different from the above-described embodiment one. The same configurations as in Embodiment one is given the same reference numerals, and description thereof is omitted.

In the present embodiment, the magnet holder 17 is made of non-magnetic material. The magnet holder 17 comprises a side wall portion 17a and a magnet mounting hole 17k, wherein the side wall portion 17a is rectangle shaped, the magnet mounting hole 17k with a substantially triangle shape is arranged in the each corner portion of the side wall portion 17a. The permanent magnets 15 having triangular prism shape matching with the magnet mounting hole 17k is held by the magnet mounting hole 17k.

In such assembled lens driving device 10, the inside holding portion 14a1 and the outside holding portion 14b1 of the front spring member 14A, the inside holding portion 14a2 and the outside holding portion 14b2 of the rear spring member 14B are all concentrically aligned without being eccentric. Furthermore, there is no strain on the arm portion 14c2 in a direction perpendicular to the Z axis, thereby the undesired stress cannot remain in the direction perpendicular to the Z-axis direction, and only a stress in the Z-axis direction remains that generated due to the outside holding portion 14b2 shift towards the −Z side.

Therefore, when the coil 16 is energized, and the rear end portion 13d of the lens holder 13 departs from the restriction portion 12a of the base 12 and moves in the +Z direction, the tilt will not occur when the lens holder 13 rotates about the axis perpendicular to the Z axis. The optical axis of lens held by the lens holder 13 can be maintained in the Z-axis direction, the image formed by the image sensor (not shown) cannot distort, and the quality of the image cannot deteriorate.

Figure 4:
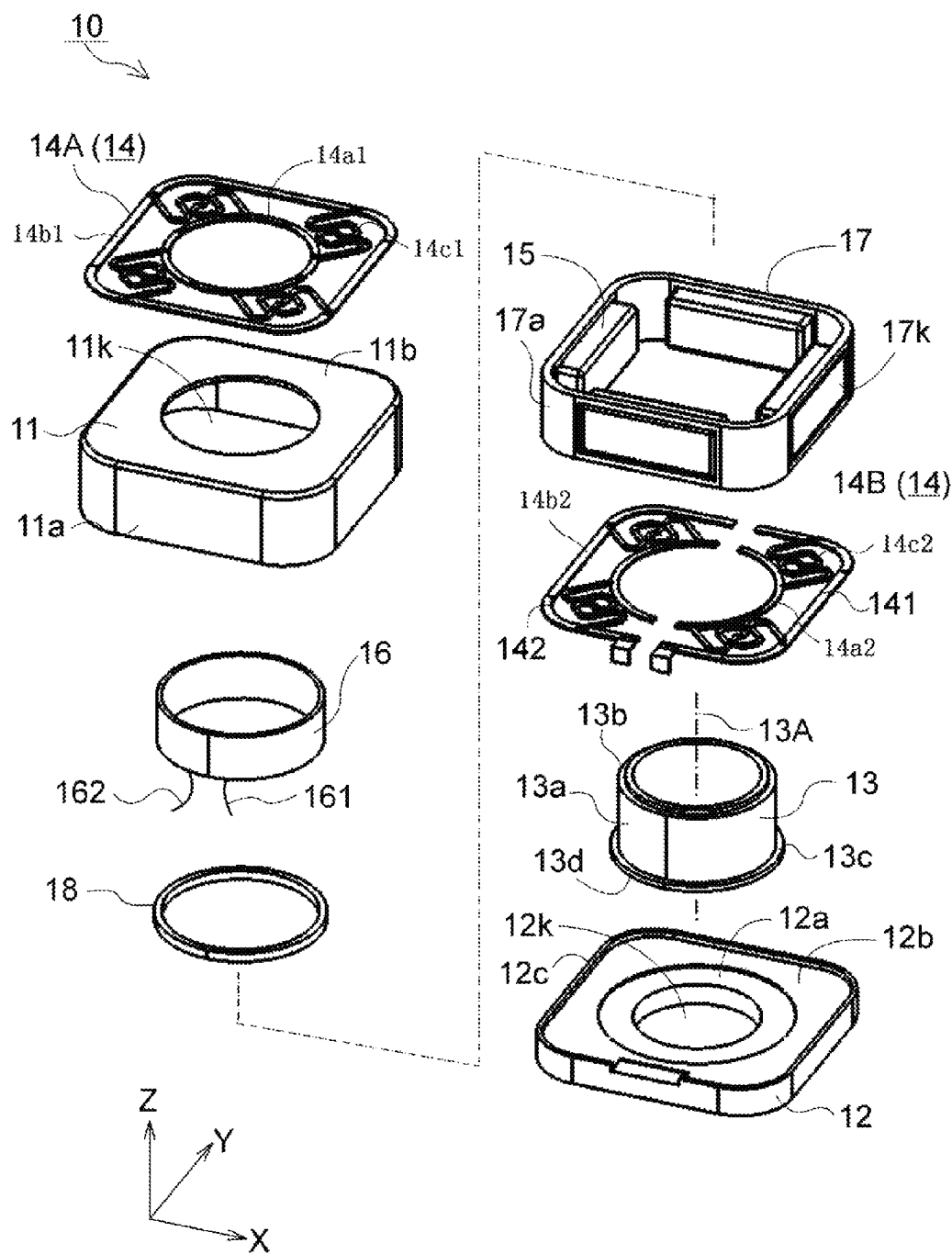
FIG. 4 shows an exploded perspective view of the lens driving device in accordance with the embodiment three of the present invention.
Figure 5:
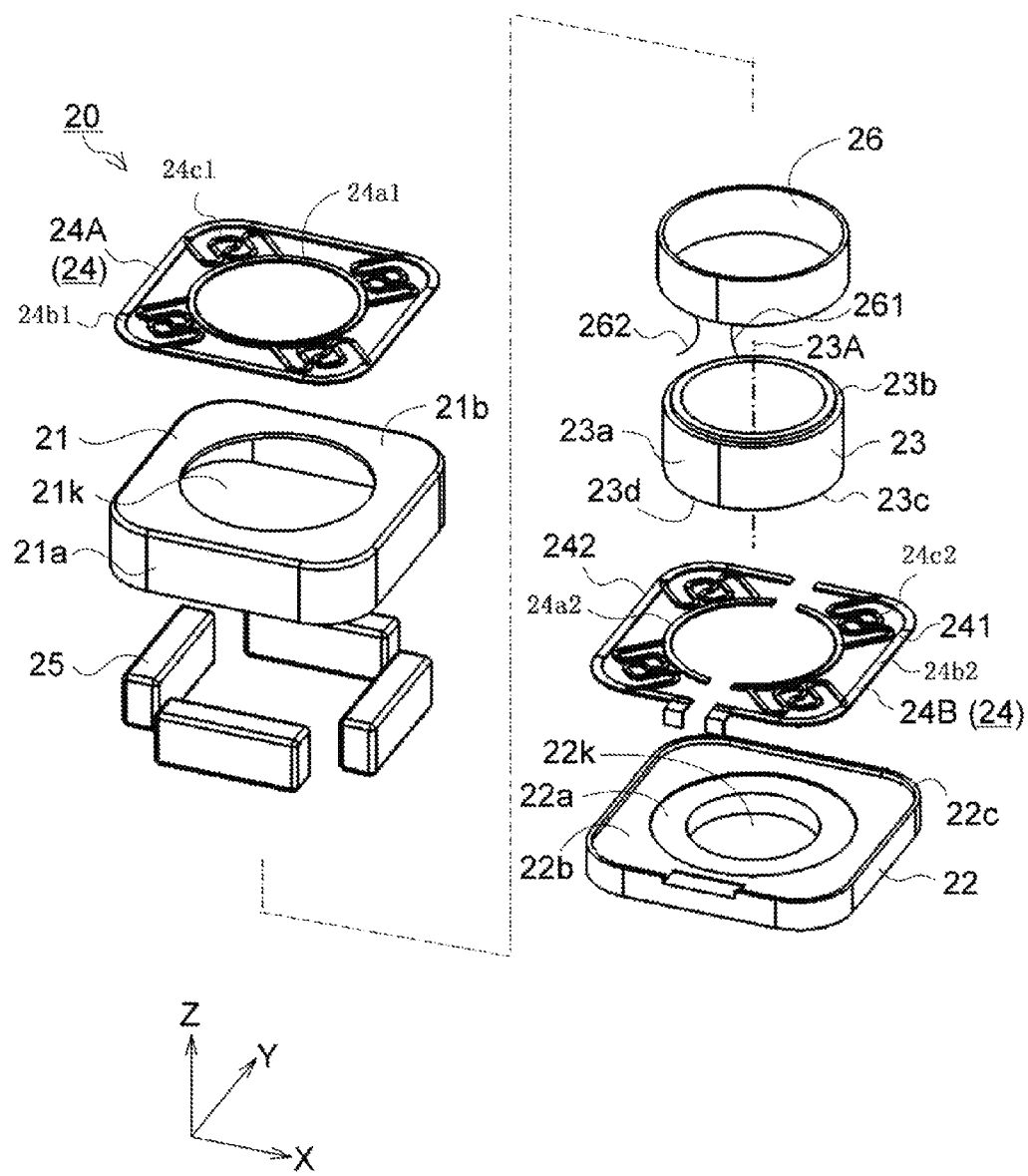
FIG. 5 shows an exploded perspective view of the lens driving device of the prior art.
Figure 6:
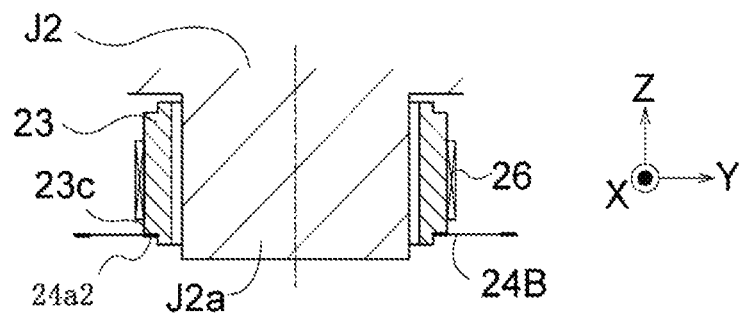
FIG. 6 shows a schematic sectional view of assembling process of the lens driving device of the prior art.
Figure 6:
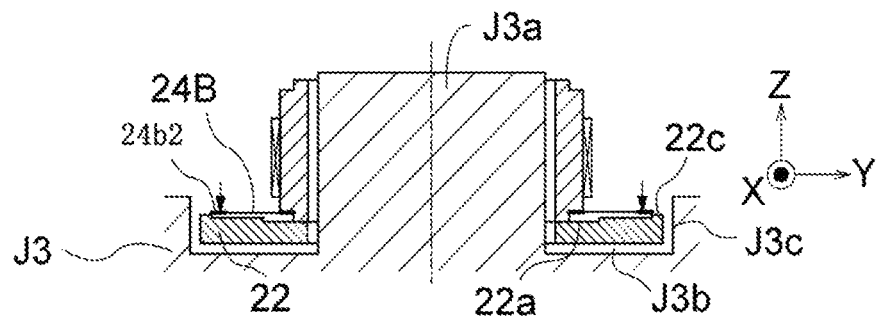
Figure 6:
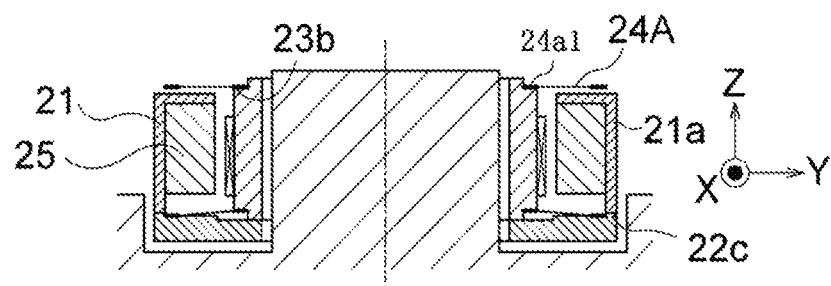
Figure 6:
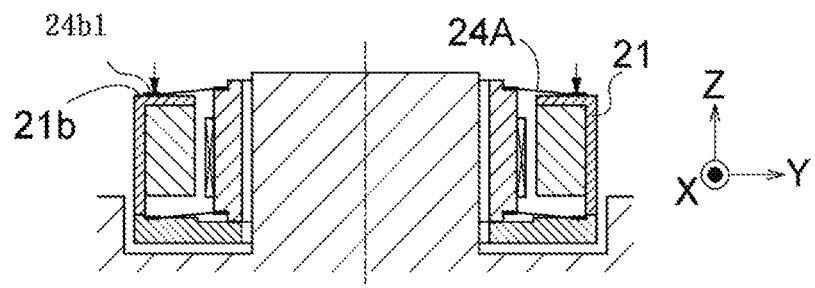
Figure 7:
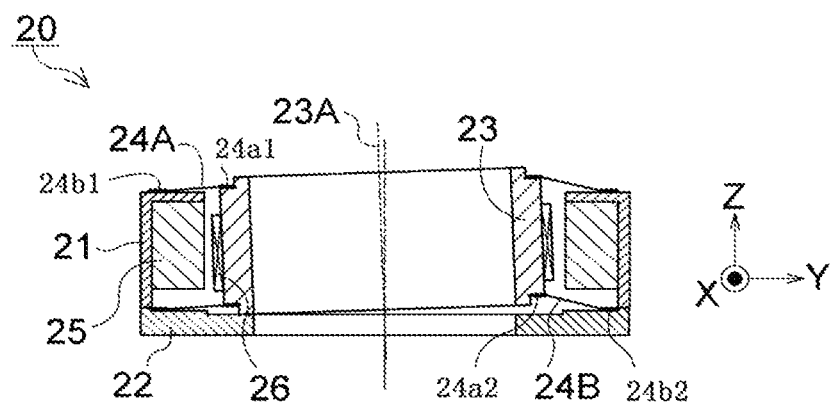
FIG. 7 shows the movement of the lens driving device of the prior art.

Furthermore, the lens driving device 10 can be assembled by stacking all the members on the mounting jig J1, which can reduce the types of the mounting jig to be used, simplify the process, shorten the time required for the assembling, and reduce manufacturing costs. FIG. 4 shows an exploded perspective view of the lens driving device 10 in accordance with the embodiment three of the present invention. In the embodiment three, the front spring member 14A is configured on the +Z side of the magnet yoke 11, that is, the configuration and interchange between the front spring member 14A and the magnet yoke 11 are different from the above embodiment. In the embodiment three, the same configurations as in embodiment one are given the same reference numerals, and description thereof is omitted.

In the present embodiment, the inside holding portion 14a1 of the front spring member 14A is connected and fixed on the surface of the +Z side of the front connection portion 13b arranged on the lens holder 13, the outside holding portion 14b1 is connected and fixed on the top surface portion 11b of the magnetic yoke 11. Further, the inside holding portion 14a2 of the rear spring member 14B is connected and fixed on the surface of the +Z side of the rear connection portion 13c arranged on the lens holder 13, the outside holding portion 14b2 is located in the inner periphery side of the edge portion 12c of the base 12 so as to adjust the position, and is connected and fixed on the surface of the +Z side of the connection surface 12b.

Thus, when the coil 16 is not energized, the prepressure in the −Z direction is applied to the lens holder 13 due to the restoring force of the arm portion 14c2. In such state, the rear end portion 13d of the lens holder 13 abuts against the restriction portion 12a of the base 12, the center axis 13A of the lens holder 13 is orientated along the Z direction, and the optical axis of Lens mounted onto the lens holder 13 is also orientated along the Z direction.

Furthermore, when the coil 16 is in the energized state, and the Lorentz force in the +Z direction applied onto the coil 16 excesses the prepressure in the −Z direction, the rear end portion 13d of the lens holder 13 depart from the restriction portion 12a of the base 122, the lens holder 13 moves in the +Z direction to a position wherein the restoring force of the arm portion 24c is balanced.

In the lens driving apparatus 10 of the present embodiment, the inside holding portion 14a1 and the outside holding portion 14b1 of the front spring member 14A, the inside holding portion 14a2 and the outside holding portion 14b2 of the rear spring member 14B are all concentrically aligned without being eccentric. Furthermore, there is no strain on the arm portion 14c1, 14c2 in a direction perpendicular to the Z axis, thereby the undesired stress cannot remain in the direction perpendicular to the Z-axis direction, and only a stress in the Z-axis direction remains that generated due to the outside holding portion 14b1, 14b2 shift towards the −Z side.

Therefore, when the coil 16 is energized, and the rear end portion 13d of the lens holder 13 departs from the restriction portion 12a of the base 12 and moves in the +Z direction, the tilt will not occur when the lens holder 13 rotates about the axis perpendicular to the Z axis. The optical axis of lens held by the lens holder 13 can be maintained in the Z-axis direction, the image formed by the image sensor (not shown) cannot distort, and the quality of the image cannot deteriorate.

Furthermore, the lens driving device 10 can be assembled by stacking all the members on the mounting jig J1, which can reduce the types of the mounting jig to be used, simplify the process, shorten the time required for the assembling, and reduce manufacturing costs.

The present invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

In the above embodiments, the magnet holder 17 may be omitted, and the permanent magnet 15 is directly mounted to the surface of the +Z side of the outside holding portion 14b2 of the rear spring member 14B. Thus, the parts cost of magnet holder 17 can be reduced.

Further, in lens driving device 10 of each embodiment, the magnet yoke 11 can be omitted to form the state of without the magnet yoke 11, and the washer 18 can also be omitted instead of directly mounting the coil 16 surface of the +Z side of the inside holding portion 14a2 of the rear spring member 14B.

What is claimed is:

1. A lens driving device, wherein the photographed object side is set as the front direction of the Z-axis, and the lens driving device comprises:
    a lens holder, having a cylindrical portion whose center axis is orientated in the Z-axis direction, and a lens is held at the inner side of the cylindrical portion,
    a spring member, which is fixed on the cylindrical portion, and supports the lens holder to move along the Z-axis direction,
    a coil, which is located in the outer peripheral side of the cylindrical portion and winds around the central axis of the cylindrical portion,
    a permanent magnet, which is arranged on the outer peripheral side of the coil and spaces a gap with the coil, and
    a base for supporting the permanent magnet, wherein,
    the spring member is composed of a front spring member and a rear spring member abuts against the rear position of the Z-axis relative to the front spring member,
    the front spring member and the rear spring member comprise:
    an arm portion, extends along the direction orthogonal to the Z-axis direction,
    an inside holding portion, is arranged on the inside of the arm portion, and connects with one end of the arm portion, and
    an outside holding portion, is arranged on the outside of the arm portion, and connects with the other end of the arm portion,
    a front connection portion and a rear connection portion of flange shape are formed on the lens holder, wherein, the front connection portion forms a groove on an outer peripheral surface of the cylindrical body and in a positive Z-axis direction of the cylindrical body, the rear connection portion has an outer diameter larger than the outer diameter of the front connection portion,
    the inside holding portion of the rear spring member is fixed on a fitting surface of the rear connecting portion that contacts the cylindrical body, faces the base and is orientated in a positive Z-axis direction of the cylindrical body,
    the inside holding portion of the front spring member is fixed on the outer peripheral surface of the cylindrical body orientated in the positive Z-axis direction of the cylindrical body,
    the outside holding portion of at least one spring member of the front spring member and the rear spring member is pressed towards a negative Z-axis direction relative to the inside holding member, so as to apply pressure to the lens holder in the negative Z-axis direction;
    an inner diameter of inside holding portion of the rear spring member is set to be larger than an outer diameter of the front connection portion of the lens holder,
    an inner diameter of inside holding portion of the front spring member is set to be smaller than an outer diameter of the front connection portion of the lens holder.

* * * * *